United States Patent
Lin

(10) Patent No.: US 10,319,077 B2
(45) Date of Patent: Jun. 11, 2019

(54) IMAGE PROCESSING METHOD FOR DEFECT PIXEL DETECTION, CROSSTALK CANCELLATION, AND NOISE REDUCTION

(71) Applicant: Silicon Optronics, Inc., Hsinchu (TW)

(72) Inventor: Chun-Hung Lin, Hsinchu (TW)

(73) Assignee: SILICON OPTRONICS, INC., Hsinchu (TW)

( * ) Notice: Subject to any disclaimer, the term of this patent is extended or adjusted under 35 U.S.C. 154(b) by 174 days.

(21) Appl. No.: 15/258,307

(22) Filed: Sep. 7, 2016

(65) Prior Publication Data

US 2017/0148141 A1    May 25, 2017

(30) Foreign Application Priority Data

Nov. 19, 2015  (TW) .............................. 104138201 A

(51) Int. Cl.
*G06K 9/40* (2006.01)
*G06T 5/00* (2006.01)

(52) U.S. Cl.
CPC .... *G06T 5/002* (2013.01); *G06T 2207/10004* (2013.01)

(58) Field of Classification Search
CPC .................. G06T 5/002; G06T 2207/10004
See application file for complete search history.

(56) References Cited

U.S. PATENT DOCUMENTS

| 7,301,673 | B2 * | 11/2007 | Kang | H04N 1/4053 345/616 |
| 8,885,221 | B2 * | 11/2014 | Tanaka | H04N 1/4052 358/1.13 |
| 8,891,866 | B2 * | 11/2014 | Shinozaki | G06T 5/00 382/167 |
| 2003/0107769 | A1 | 6/2003 | Kang | |
| 2003/0193679 | A1 * | 10/2003 | Iwasaki | H04N 1/52 358/1.9 |

(Continued)

FOREIGN PATENT DOCUMENTS

TW    200721801 A    6/2007
TW    201524186 A    6/2015

(Continued)

*Primary Examiner* — Gregory M Desire
(74) *Attorney, Agent, or Firm* — Muncy, Geissler, Olds & Lowe, P.C.

(57) ABSTRACT

An image processing method is provided. The method includes the steps of: receiving upper image data; calculating a first ratio using a target pixel and a plurality of first reference pixels in the upper image data; calculating a first diffusion coefficient according to the first ratio and a diffusion coefficient mapping equation; calculating a first pixel value of the target pixel according to the target pixel, the first reference pixels, and the first diffusion coefficient; receiving lower image data; calculating a second ratio using the target pixel and a plurality of second reference pixels in the lower image data, wherein the target pixel has the first pixel value; calculating a second diffusion coefficient according to the second ratio and the diffusion coefficient mapping equation; and calculating a second pixel value of the target pixel according to the target pixel, the second reference pixels, and the second diffusion coefficient.

6 Claims, 9 Drawing Sheets

(56) References Cited

U.S. PATENT DOCUMENTS

| | | | | |
|---|---|---|---|---|
| 2005/0129309 A1* | 6/2005 | Kang | ........................ | H04N 1/52 |
| | | | | 382/167 |
| 2014/0016005 A1* | 1/2014 | Kishima | ................ | H04N 5/367 |
| | | | | 348/246 |
| 2017/0061184 A1* | 3/2017 | Wang | .................... | G06K 7/1413 |
| 2017/0148141 A1* | 5/2017 | Lin | .......................... | G06T 5/002 |

FOREIGN PATENT DOCUMENTS

| | | |
|---|---|---|
| TW | 201536053 A | 9/2015 |
| WO | WO 2011/083606 A1 | 7/2011 |
| WO | WO 2013/142176 A2 | 9/2013 |

\* cited by examiner

| Line buffer 1 | G | R0 | G | R1 | G | R2 |
|---|---|---|---|---|---|---|
| Line buffer 2 | B | G | B | G | B | G |
| Line buffer 3 | G | R3 | G | R4 | G | R5 |
| Line buffer 4 | B | G | B | G | B | G |
| current line | G | R6 | G | R7 | G | R8 |
| | B | G | B | G | B | G |

FIG. 1

| G0 | R0 | G1 | R1 | G2 | R2 |
| Gi | B | Gj | B | G |
| G3 | R3 | G4 | R4 | G5 | R5 |
| Gm | B | Gn | B | G |
| G6 | R | G7 | R | G8 | R |

IMAGE PROCESSING METHOD FOR DEFECT PIXEL DETECTION, CROSSTALK CANCELLATION, AND NOISE REDUCTION

CROSS REFERENCE TO RELATED APPLICATIONS

This Application claims priority of Taiwan Patent Application No. 104138201, filed on Nov. 19, 2015, the entirety of which is incorporated by reference herein.

BACKGROUND OF THE INVENTION

Field of the Invention

The present invention relates to an image processing method and, in particular, to a method for eliminating noise in an image.

Description of the Related Art

When an image sensor detects an image, the quality of the image output from the image sensor is strongly affected by noise caused by the internal circuits of the image sensor, or by defect pixels inside the image sensor. Accordingly, it has become an important issue to process sensor data from the image sensor to eliminate the negative effects of noise and defect pixels of the image sensor.

BRIEF SUMMARY OF THE INVENTION

A detailed description is given in the following embodiments with reference to the accompanying drawings.

In an exemplary embodiment, an image processing method is provided. The method includes the steps of: receiving upper image data; calculating a first ratio using a target pixel and a plurality of first reference pixels in the upper image data; calculating a first diffusion coefficient according to the first ratio and a diffusion coefficient mapping equation; calculating a first pixel value of the target pixel according to the target pixel, the first reference pixels, and the first diffusion coefficient; receiving lower image data; calculating a second ratio using the target pixel and a plurality of second reference pixels in the lower image data, wherein the target pixel has the first pixel value; calculating a second diffusion coefficient according to the second ratio and the diffusion coefficient mapping equation; and calculating a second pixel value of the target pixel according to the target pixel, the second reference pixels, and the second diffusion coefficient.

In another exemplary embodiment, an image processing method is provided. The method includes the steps of: retrieving pixel data of the nth row, (n−1)th row, and (n−2)th row of a target pixel; calculating a first compensated pixel value of the target pixel according to the target pixel and a plurality of first reference pixels and determining whether the target pixel is a possible defect pixel; retrieving pixel data of the nth row, (n+1)th row, and (n+2)th row of a target pixel when the target pixel is a possible defect pixel; determining whether the target pixel is a possible defect pixel according to the retrieved pixel data of the nth row, (n+1)th row, and (n+2)th row of a target pixel; and performing a defect pixel compensation process on the target pixel when it is determined that the target pixel is a defect pixel.

In yet another exemplary embodiment, an image processing device is provided. The image processing device includes an upper image processing device and a lower image processing device. The upper image processing device is configured to receive upper image data, and perform image processing on a target pixel to obtain a first pixel value of the target pixel according to the received upper image data, wherein the target pixel in the upper image data has an initial pixel value. The lower image processing device is configured to receive lower image data, and perform image processing on the target pixel to obtain a second pixel value of the target pixel according to the received lower image data. If the upper image processing device determines that the target pixel is not a possible defect pixel, the target pixel in the lower image data has the first pixel value. If the upper image processing device determines that the target pixel is a possible defect pixel, the lower image processing device receives the lower image data and determines whether the target pixel is a defect pixel according to the lower image data, wherein the target pixel in the lower image data has the initial pixel value.

BRIEF DESCRIPTION OF THE DRAWINGS

The present invention can be more fully understood by reading the subsequent detailed description and examples with references made to the accompanying drawings, wherein:

FIG. 1 is a diagram illustrating image processing on a pixel;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

FIG. 1 is a diagram illustrating image processing on a pixel. As shown in FIG. 1, an image processing is to be performed on the pixel R4, such as noise cancellation, and thus pixels in four vertical neighboring rows (i.e. two neighboring rows upper to pixel R4, and two neighboring rows below the pixel R4) of the pixel R4 are used for the image processing. Accordingly, at least four line buffers are used to store the pixel data of four neighboring rows. The label "current line", as shown in FIG. 1, indicates the current row being read by the image processing circuit, and no additional line buffer is required for the current row.

Since the resolution of the image sensor has become higher and higher, the amount of pixel data in each row has also become greater and greater, resulting in a larger memory space for the required line buffers. Accordingly, an image sensor and an associated image processing method are disclosed in the application, and the image processing circuit is capable of performing detection and compensation for defect pixels and noise reduction by using two line buffers.

Figure 2A:
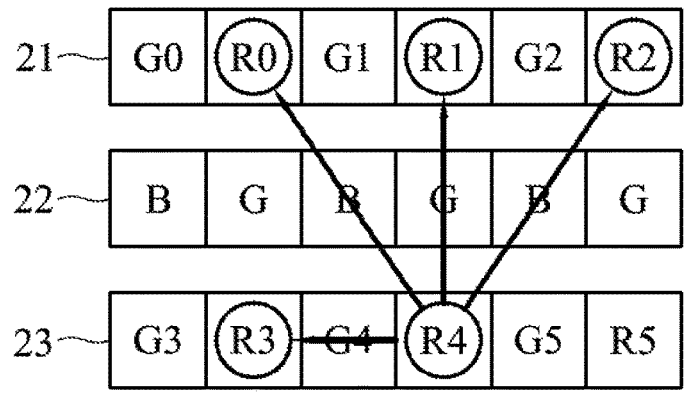
FIG. 2A and FIG. 2B are diagrams illustrating the image processing method performed by an image processing circuit in accordance with an embodiment of the invention.
Figure 2B:
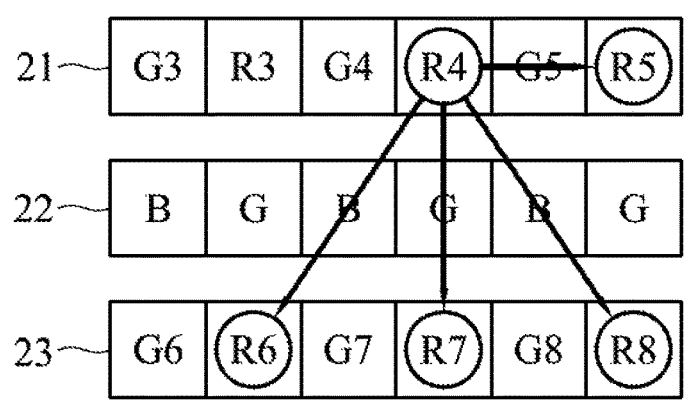

More details of the image processing method of the invention are described with FIG. 2A and FIG. 2B. FIG. 2A and FIG. 2B are diagrams illustrating the image processing method performed by an image processing circuit in accordance with an embodiment of the invention. The image data shown in FIG. 1 is used as the image data in FIG. 2A and FIG. 2B, where the image processing is based on pixel R4. Referring to FIG. 2A, at the first time point, the upper half image data shown in FIG. 1 are obtained from the first line buffer 21, second line buffer 22, and image data 23 currently read by the image processing circuit. Steps of the image processing method are described as follows:

Step 1: calculating a pixel average value of adjacent pixels in the same color as the target pixel R4 (e.g. red). The equation for calculating the pixel average pixel value I' can be expressed as follows:

$$\bar{I} = \frac{1}{\omega} \sum_{i \in w_k} I_i \quad (1)$$

Where $\omega_k$ denotes the pixels in a sample window, and the size of the sample window can be defined by the image processing application or by the user. For example, the image data shown in FIG. 1 is defined by a sample window.

Step 2: calculating a pixel variance value δ using the pixel value of the target pixel R4 and its neighboring pixels. The equation for calculating the pixel variance value δ can be expressed as follows:

$$\delta_i = P - I_i \quad (2\text{-}1)$$

where P denotes the pixel value of the target pixel R4, $I_i$ are pixel values of the reference pixels in the same color as the target pixel R4, such as the pixel R0. In FIG. 2A, five pixels R0, R1, R2, R3 and R5 have the same color as the target pixel R4. However, the pixel R5 is not considered in the embodiment of FIG. 2A, and the reference pixel R5 is used as the reference pixel while performing the image processing on the lower half image data in FIG. 1. In another embodiment, the reference pixels R3 and R5 can be used as reference pixels while performing the image processing on the upper half image and the lower half image in FIG. 1.

In another embodiment, the equation for calculating the pixel variance 6 can be expressed as follows:

$$\delta_i = (P - I_i)^2 \quad (2\text{-}2)$$

Either one of the equations (2-1) or (2-2) can be used to calculate the pixel variance value in the invention.

Step 3: calculating a delta-mean ratio according to the pixel average value and the pixel variance value, where the equation for calculating the delta-mean ratio can be expressed as follows:

$$DMR_i = \delta_i / \bar{I} \quad (3)$$

where $\delta_i$ is the pixel variance value, and $\bar{I}$ is the pixel average value, as described above. It should be noted that the neighboring pixels in different colors are calculated separately, and the delta-mean ratios for different colors (i.e. for R, G, and B) are also calculated separately.

Figure 3:
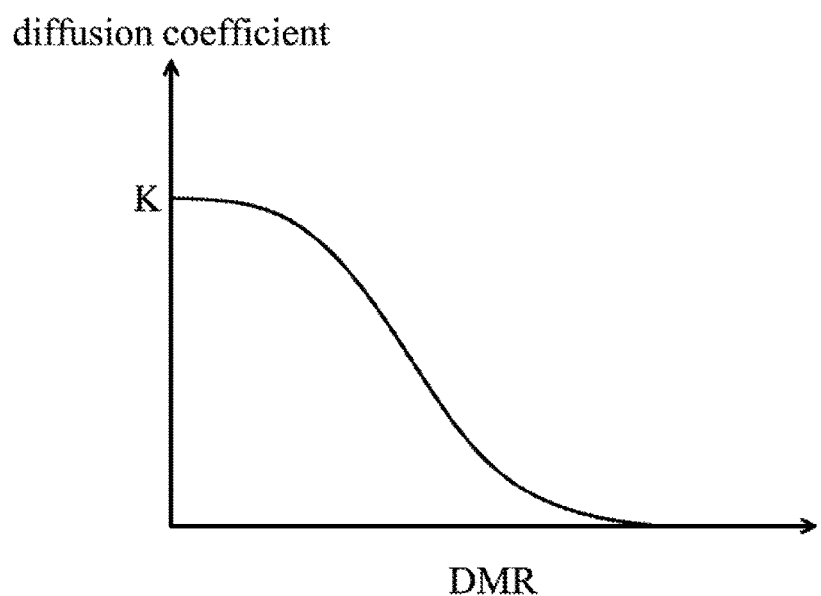
FIG. 3 is a diagram of a diffusion coefficient mapping equation in accordance with an embodiment of the invention.

Step 4: calculating a diffusion coefficient of the target pixel relative to the reference pixels using a diffusion coefficient mapping equation according to the calculated delta-mean ratio. For example, the curve of the diffusion coefficient mapping equation is illustrated in FIG. 3. FIG. 3 is a diagram of a diffusion coefficient mapping equation in accordance with an embodiment of the invention. Referring to FIG. 3, the x-axis denotes the absolute value of the delta-mean ratio from the equation (3), and the y-axis denotes the value of the diffusion coefficient. If the absolute value of the delta-mean ratio obtained from the equation (3) is larger, it indicates the complexity of the image in the sample window is higher, resulting in a smaller diffusion coefficient. If the absolute value of the delta-mean ratio obtained from the equation (3) is smaller, it indicates the complexity of the image in the sample window is lower, resulting in a greater diffusion coefficient. In addition, the diffusion coefficients of the reference pixels relative to the target pixel R4 are not the same. From another point of view, the diffusion coefficient can be regarded as the correlation between the reference pixel and the target pixel R4. If the correlation is higher, the weighting factor of the reference pixel for correlating or compensating the target pixel is larger. If the correlation is lower, the weighting factor of the reference pixel for correlating or compensating the target pixel is smaller.

Step 5: calculating the correlated pixel value P' of the target pixel R4 using the equations (1)~(3), where the equation for calculating the correlated pixel value P' can be expressed as follows:

$$P' = P + \Sigma_{i \in w_K} I_i \cdot K_i$$

where P' denotes the correlated pixel value of the target pixel; and $K_i$ denotes the diffusion coefficient of the reference pixels. After processing all pixels in the image data 23, the processed image data 23 is stored in the first line buffer 21, and the fourth row (i.e. labeled as "Line buffer 4") of the image data in FIG. 1 is stored in the second line buffer 22, and the image processing circuit reads data of the current row, such as the fifth row (i.e. labeled as "current line") shown in FIG. 1. The image processing circuit performs steps 1~5 on the target pixel R4 based on the reference pixels R5, R6, R7, and R8, thereby completing the image processing of the target pixel R4.

Figures 4, 5:
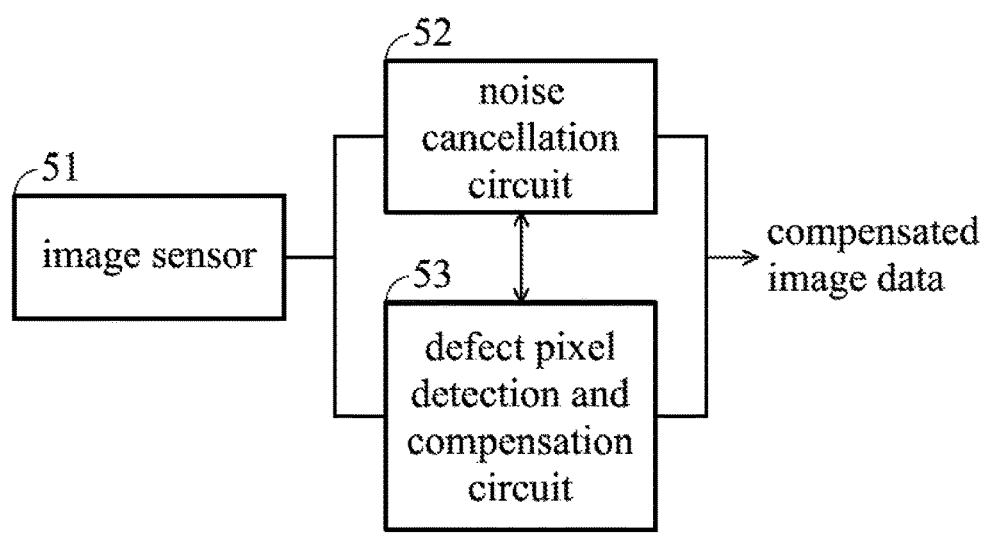
FIG. 4 is a diagram illustrating image data for performing an image processing on a green pixel in accordance with an embodiment of the invention.
FIG. 5 is a diagram of an image sensor module in accordance with an embodiment of the invention.

It should be noted that the aforementioned image processing method can be applied to red pixels, green pixels, and blue pixels. However, additional crosstalk issues for the green pixels should be further considered. FIG. 4 is a diagram illustrating image data for performing an image processing on a green pixel in accordance with an embodiment of the invention. As described above, the image processing method includes image processing on the half upper image data and on the half bottom image data. The image processing circuit may perform the aforementioned steps 1~5 on the target pixel G4 based on the reference pixels G0, G1, G2, G3, Gi, and Gj, thereby completing the image processing of the upper half image data associated with the target pixel G4. Subsequently, the image processing circuit may also perform the aforementioned steps 1~5 on the target pixel G4 based on the reference pixels G5, G6, G7, G8, Gm, and Gn, thereby completing the image processing of the lower half image data associated with the target pixel G4.

In another embodiment, the image processing circuit may perform a crosstalk cancellation process on the upper half image data associated with the target pixel G4 based on the reference pixels Gi and Gj. Then, the image processing circuit may further perform the crosstalk cancellation process on the lower half image data associated with the target pixel G4 based on the reference pixels Gm and Gn.

A common image processing method includes defect pixel detection and compensation, image noise reduction, and image crosstalk cancellation. However, conventional image processing methods has to perform the aforementioned image processes using different circuits, or perform the aforementioned image processes at different points in time different times, resulting in a larger number of line buffers and inefficiency due to non-sharable image data between different image processing circuits of the aforementioned image processes. However, the aforementioned image processing method in the invention may improve the deficiencies of the conventional image processing methods.

FIG. 5 is a diagram of an image sensor module in accordance with an embodiment of the invention. The image sensor module comprises an image sensor 51, a noise reduction circuit 52, and a defect pixel detection and compensation circuit 53. In the embodiment, the image sensor module further includes an evaluation circuit (not shown in FIG. 5), that can be disposed in the noise reduction circuit 52 or the defect pixel detection and compensation circuit 53, configured to receive the raw data from the image sensor 51 and perform the aforementioned steps 1~3 on the received raw data. The evaluation circuit may calculate a first pixel variance value using a plurality of reference pixels in the upper half image data of a sample window associated with a target pixel, and calculates a first delta-mean ratio. Then, the evaluation circuit determines whether the absolute value of the first delta-mean ratio is greater than a defect threshold. If the absolute value of the first delta-mean ratio is not greater than a defect threshold, it indicates that the target pixel is not a defect pixel, and the evaluation circuit provides the first pixel variance value and the first delta-mean ratio to the noise cancellation circuit 52 for performing the noise cancellation processes, as described in the aforementioned steps 3~5.

If the absolute value of the first delta-mean ratio is greater than a defect threshold, it indicates that the target pixel is a possible defect pixel. The evaluation circuit may inform the noise cancellation circuit 52 temporarily not to perform the noise cancellation processes on the target pixel. The evaluation circuit further determines whether the delta-mean ratio is positive or negative. If the first delta-mean ratio is positive, it indicates that the target pixel may be a bright pixel of the defect pixels. If the first delta-mean ratio is negative, it indicates that the target pixel may be a dark pixel of the defect pixels.

Subsequently, the evaluation circuit may calculate a first pixel variance value using a plurality of reference pixels in the lower half image data of a sample window associated with a target pixel, and calculates a second delta-mean ratio. Then, the evaluation circuit determines whether the absolute value of the second delta-mean ratio is greater than the defect threshold. If the absolute value of the second delta-mean ratio is not greater than a defect threshold, it indicates that the target pixel is not a defect pixel, and the noise cancellation circuit 52 may perform the noise cancellation processes according to the first delta-mean ratio and the second delta-mean ratio, as described in the aforementioned steps 3~5.

If the absolute value of the second delta-mean ratio is larger than then defect threshold, the evaluation circuit may determine whether the second delta-mean ratio is positive or negative. If both the first delta-mean ratio and the second delta-mean ratio are positive or negative, the evaluation circuit may determine that the target pixel is a defect pixel, and transmits the calculated parameters to the defect pixel detection and compensation circuit 53 for performing the subsequent defect pixel compensation process. If the first delta-mean ratio and the second delta-mean ratio are not both positive or negative, it indicates that the target pixel is not a defect pixel, and the noise cancellation circuit 52 may perform the noise cancellation processes according to the first delta-mean ratio and the second delta-mean ratio, as described in the aforementioned steps 3~5.

Although the naming of the defect pixel detection and compensation circuit 53 implicitly includes defect pixel detection, the defect pixel detection is actually performed by the evaluation circuit. When the evaluation circuit is disposed in the noise cancellation circuit 52, the defect pixel detection and compensation circuit 53 performs the defect pixel compensation process only on the defect pixel detected by the noise cancellation circuit 52. If the evaluation circuit is disposed in the defect pixel detection and compensation circuit 53, the evaluation may provide the calculated parameters to the noise cancellation circuit 52 for subsequent noise cancellation processes when the evaluation circuit determines that the target pixel is not a defect pixel.

Specifically, when the evaluation circuit is disposed in the noise cancellation circuit and the evaluation circuit determines that the target pixel is a defect pixel, the noise cancellation circuit 52 may have completed the noise cancellation process as steps 3~5. However, in the embodiment, the noise cancellation circuit 52 does not store the processed image data to the first line buffer 21 as described in step 5. Instead, the noise cancellation circuit 52 may inform the evaluation circuit to perform the image processing on the lower half image data associated with the target pixel to determine whether the target pixel is a defect pixel. If it is determined that the target pixel is not a defect pixel, the noise cancellation circuit 52 may complete the noise cancellation processes of the target pixel. If it is determined that the target pixel is a defect pixel, the noise cancellation circuit 52 may abandon the results after the noise cancellation processes, and the defect pixel detection and compensation circuit 53 may perform defect compensation on the target pixel.

In another embodiment, if the target pixel is not determined as a possible defect pixel during the image processing of the upper half image data, it is not necessary to perform the calculation for determining whether the target pixel is a possible defect pixel during the image processing of the lower half image data.

Figure 6:
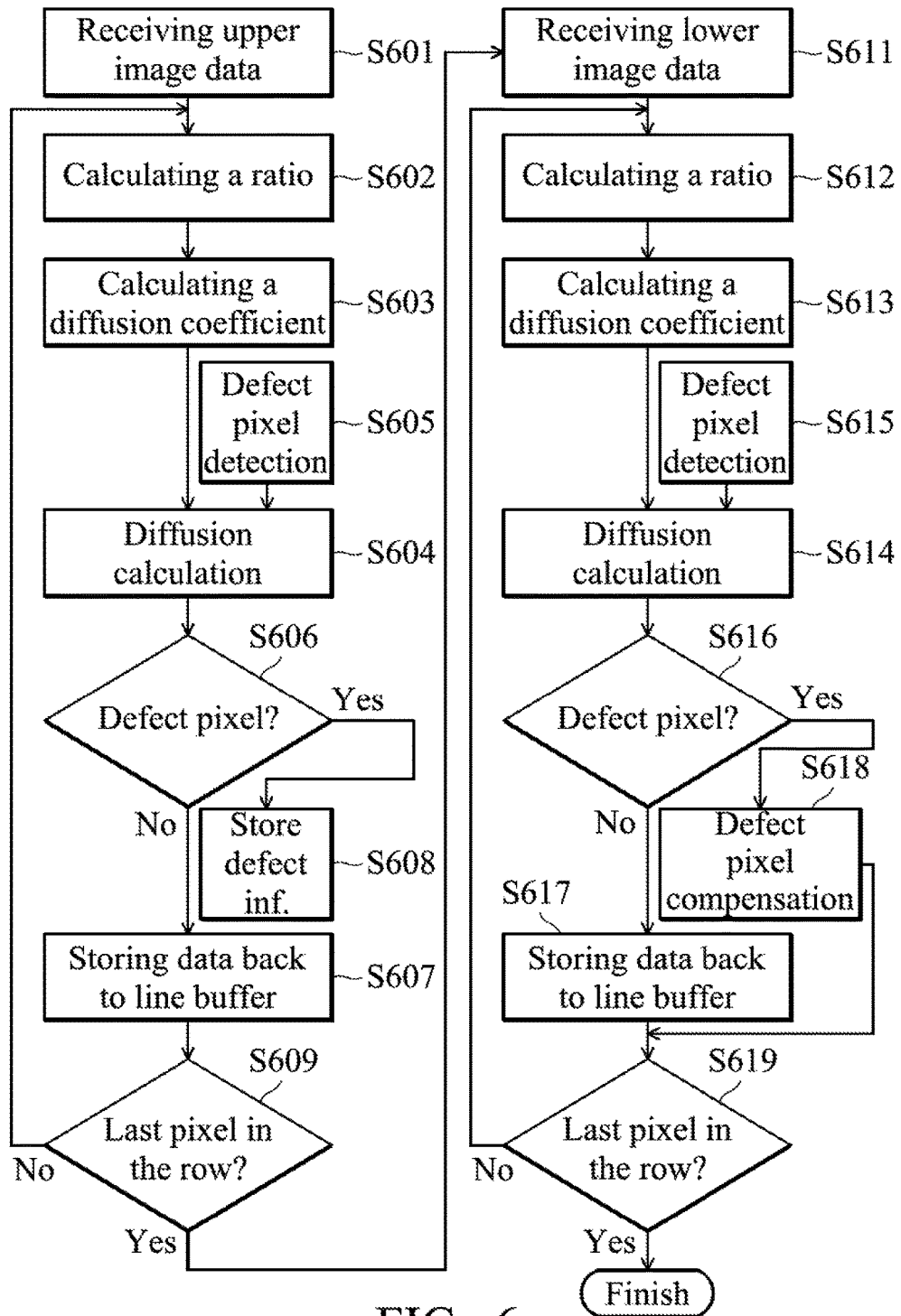
FIG. 6 is a flow chart of an image processing method in accordance with an embodiment of the invention.

FIG. 6 is a flow chart of an image processing method in accordance with an embodiment of the invention. The image processing method of the embodiment in FIG. 6 is performed by an image processing circuit of an image sensor module. The image processing circuit receives raw data detected by an image sensor of the image sensor module, and processes the received raw data to output an image data to other apparatuses. In an embodiment, the image processing circuit can be implemented by the noise cancellation circuit 52, the defect pixel detection and compensation circuit 53, and the evaluation circuit shown in FIG. 5.

In step S601, the image processing circuit receives upper half image data associated with a target pixel.

In step S602, the image processing circuit calculates a pixel average value according to the target pixel and a plurality of reference pixels in the upper half image data associated with the target pixel, as described in the equation (1). Then, the image processing circuit calculates a pixel variance value according to pixel values of the target pixel and the reference pixels, as described in the equations (2-1) or (2-2). The image processing circuit calculates a delta-mean ratio according to the calculated pixel average value and pixel variance value, as described in the equation (3).

In step S603, the image processing circuit calculates a diffusion coefficient according to the calculated delta-mean ratio and a diffusion coefficient mapping equation.

In step S604, the image processing circuit performs a diffusion calculation on the target pixel to obtain the pixel value of the compensated target pixel according to the diffusion coefficient and the pixel value of the reference pixels.

In step S605, the image processing circuit performs defect pixel detection on the target pixel. In an embodiment, the image processing circuit may determine whether the target pixel is a possible defect pixel according to the pixel variance value obtained in step S602.

In step S606, if the target pixel is a possible defect pixel, step S608 is performed. If the target pixel is not a possible defect pixel, step S607 is performed.

In step S607, the image processing circuit stores the pixel value of the target pixel into a line buffer. In an embodiment, the image processing circuit may stores the pixel values of the compensated pixels into the line buffer after all pixels in the row associated with the current pixel have been compensated for.

In step S608, the image processing circuit stores defect information of the target pixel, where the defect information may be a dark pixel or a bright pixel.

In step S609, the image processing circuit determines whether the target pixel is the last pixel in the current row. If the target pixel is the last pixel in the current row, the image processing for the upper half image data is finished. If the target pixel is not the last pixel in the current row, performs the aforementioned steps on the next pixel of the current target pixel.

In step 611, the image processing circuit receives lower half image data associated with the target pixel.

In step S612, the image processing circuit calculates a pixel average value according to the target pixel and a plurality of reference pixels in the lower half image data associated with the target pixel, as described in equation (1). Then, the image processing circuit calculates a pixel variance value according to the pixel values of the target pixel and the reference pixels, as described in equation (2-1) or (2-2). The image processing circuit calculates a delta-mean ratio according to the calculated pixel average value and pixel variance value, as described in equation (3).

In step 613, the image processing circuit calculates a diffusion coefficient according to the calculated delta-mean ratio and a diffusion coefficient mapping equation.

In step S614, the image processing circuit performs a diffusion calculation on the target pixel to obtain the pixel value of the compensated target pixel according to the diffusion coefficient and the pixel value of the reference pixels.

In step S615, the image processing circuit performs defect pixel detection on the target pixel. In an embodiment, the image processing circuit may determine whether the target pixel is a defect pixel according to the calculated pixel variance value obtained in step S602.

In step S616, the image processing circuit determines whether the target pixel is a defect pixel according to the stored defect information in step S608 and the determination results of the defect pixel in the lower half image data. If the target pixel is a defect pixel, step S618 is performed. If the target pixel is not a defect pixel, step S617 is performed.

In step S617, the image processing circuit stores the pixel value of the compensated target pixel into a line buffer. In an embodiment, the image processing circuit may stores the pixel values of the compensated pixels into the line buffer after all pixels in the row associated with the current pixel have been compensated for.

In step S618, the image processing circuit performs a defect pixel compensation process on the target pixel.

In step S619, the image processing circuit determines whether the target pixel is the last pixel in the current row. If the target pixel is the last pixel in the current row, the image processing for the target pixel is finished. If the target pixel is not the last pixel in the current row, the image processing circuit performs the aforementioned steps on the next pixel of the target pixel.

Figure 7:
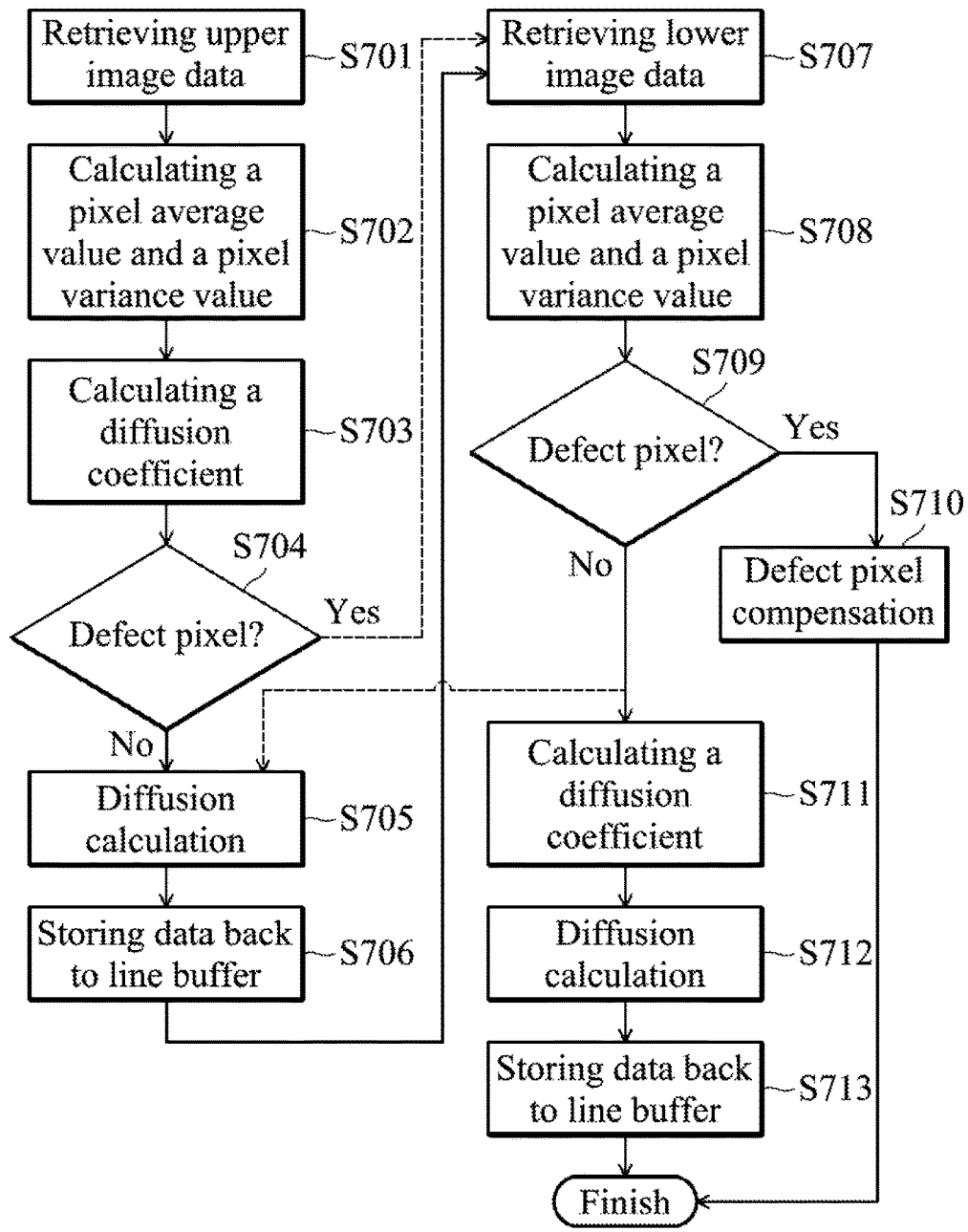
FIG. 7 is a flow chart of an image processing method in accordance with another embodiment of the invention.

FIG. 7 is a flow chart of an image processing method in accordance with another embodiment of the invention. The image processing method of the embodiment in FIG. 7 is performed by an image processing circuit of an image sensor module. The image processing circuit receives raw data detected by an image sensor of the image sensor module, and processes the received raw data to output an image data to other apparatuses. In an embodiment, the image processing circuit can be implemented by the noise cancellation circuit 52, the defect pixel detection and compensation circuit 53, and the evaluation circuit shown in FIG. 5.

In step S701, the image processing circuit retrieves pixel data of the nth row, (n−1)th row, and (n−2)th row of the target pixel, wherein pixel data of the (n−2)th row are stored in a first line buffer, and pixel data of the (n−1)th row are stored in a second line buffer.

In step S702, the image processing circuit calculates a pixel average value according to the target pixel and a plurality of reference pixels in the upper half image data associated with the target pixel, as described in the equation (1). Then, the image processing circuit calculates a pixel variance value according to pixel values of the target pixel and the reference pixels, as described in the equations (2-1) or (2-2).

In step S703, The image processing circuit calculates a delta-mean ratio according to the calculated pixel average value and pixel variance value, as described in the equation (3), and then performs a diffusion calculation on the target pixel to obtain the pixel value of the compensated target pixel according to the diffusion coefficient and the pixel value of the reference pixels In step S704, the image processing circuit determines whether the target pixel is a possible defect pixel according to the calculated pixel variance value or delta-mean ratio. If the image processing circuit determines that the target pixel is a possible defect pixel, step S707 is performed. If the image processing circuit determines that the target pixel is not a defect pixel, step S705 is performed.

In step S707, the image processing circuit retrieves pixel data of the nth row, (n+1)th row, and (n+2)th row of the target pixel. It should be noted that if the target pixel is not a possible defect pixel, the pixel data of the nth row is retrieved from the first line buffer as described in step S706. If the target pixel is a possible defect pixel, the pixel data of the nth row is the same as that of the nth row obtained in step S701.

In step S708, the image processing circuit calculates a pixel average value according to the target pixel and a plurality of reference pixels in the lower half image data associated with the target pixel, as described in the equation (1). Then, the image processing circuit calculates a pixel variance value according to pixel values of the target pixel and the reference pixels, as described in the equations (2-1) or (2-2). The image processing circuit calculates a delta-mean ratio according to the calculated pixel average value and pixel variance value, as described in the equation (3).

In step S709, the image processing circuit determines whether the target pixel is a defect pixel according to the calculated pixel variance value. If the image processing circuit determines that the target pixel is a defect pixel, and the determined defect pixel type in step S709 is the same as that in step S707, it can be ensured that the target pixel is a defect pixel. Then, the image processing circuit performs step S710 to perform a defect pixel compensation process.

If the image processing circuit determines that the target pixel is not a defect pixel in step S709, the flow goes back to step S705. In step S705, the image processing circuit performs a diffusion calculation on the target pixel to obtain the pixel value of the compensated target pixel according to the diffusion coefficient and the pixel value of the reference pixels. In step S706, the image processing circuit stores the processed pixel data of the nth row in the upper half image data into the first line buffer, and performs step S707.

It should be noted that if the image processing circuit determines that the target pixel is a defect pixel in step S704 and determines that the target pixel is not a defect pixel in step S709, step S711 and its subsequent steps are directly performed after step S706 has been performed.

In step S711, the image processing circuit calculates a diffusion coefficient according to the delta-mean ratio obtained in step S708 and a diffusion coefficient mapping equation.

In step S712, the image processing circuit performs a diffusion calculation on the target pixel to obtain the pixel value of the compensated target pixel according to the diffusion coefficient and the pixel value of the reference pixels.

In step S713, the image processing circuit stores the processed pixel data of the nth row in the lower half image data back to the first line buffer.

Figure 8:
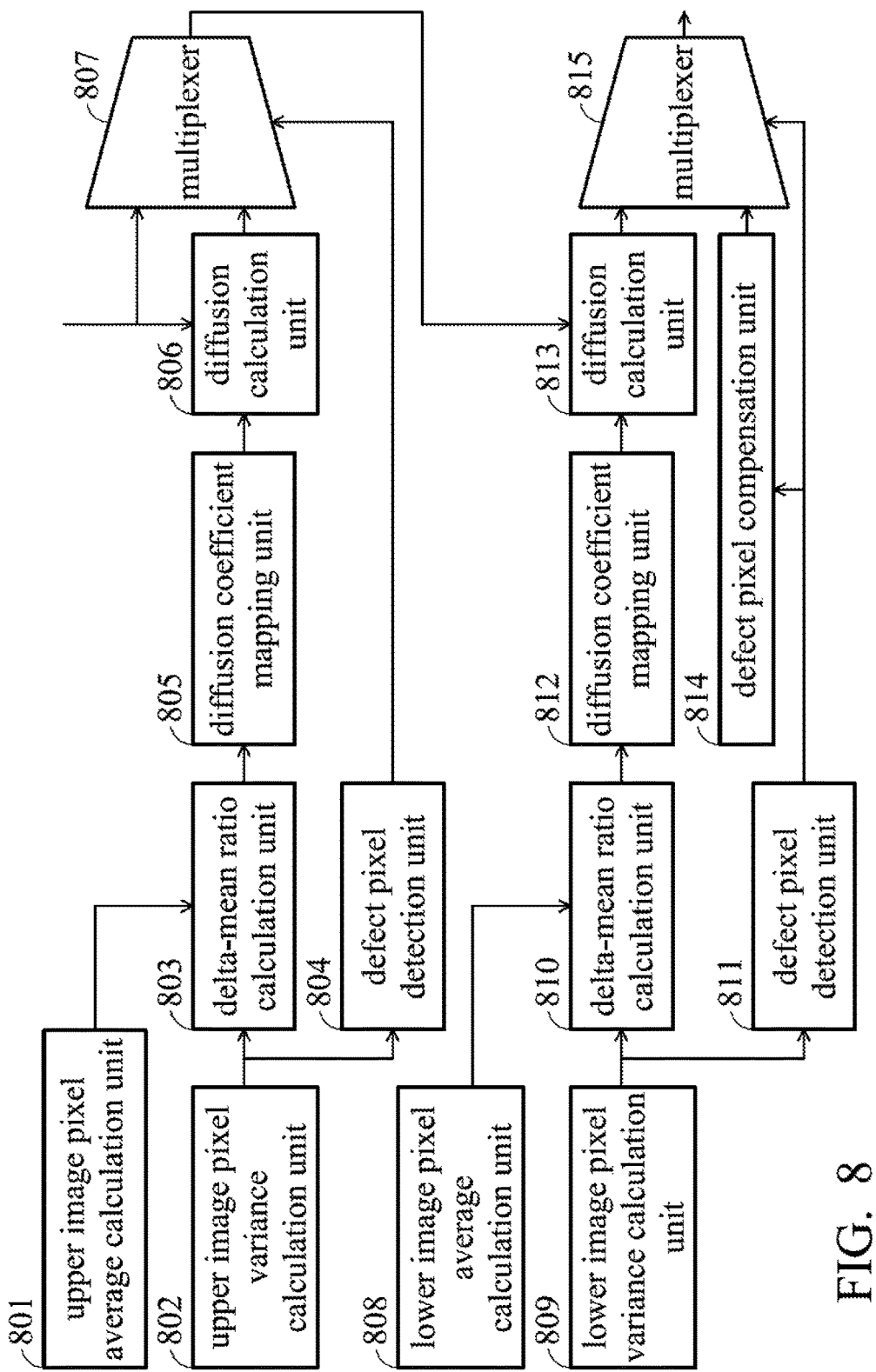
FIG. 8 is a diagram of an image processing device in accordance with an embodiment of the invention.

FIG. 8 is a diagram of an image processing device in accordance with an embodiment of the invention. In the embodiment of FIG. 8, the image processing device may be circuitry in an image processing module or circuitry in an external image processing module. In the embodiment, the "unit" is a common technical term that can be implemented by a hardware circuit or by a controller executing software. In another embodiment, a plurality of units can be implemented by a single circuit.

The image processing device comprises an upper image pixel average calculation unit 801, an upper image pixel variance calculation unit 802, a delta-mean ratio calculation unit 803, a defect pixel detection unit 804, a diffusion coefficient mapping unit 805, a diffusion calculation unit 806, a multiplexer 807, a lower image pixel average calculation unit 808, a lower image pixel variance calculation unit 809, a delta-mean ratio calculation unit 810, a defect pixel detection unit 811, a diffusion coefficient mapping unit 812, a diffusion calculation unit 813, a defect pixel detection unit 814, and a multiplexer 815.

From another point of view, the upper image pixel average calculation unit 801, upper image pixel variance calculation unit 802, delta-mean ratio calculation unit 803, defect pixel detection unit 804, diffusion coefficient mapping unit 805, and diffusion calculation unit 806 can be regarded as an upper image processing device. The lower image pixel average calculation unit 808, lower image pixel variance calculation unit 809, delta-mean ratio calculation unit 810, defect pixel detection unit 811, diffusion coefficient mapping unit 812, diffusion calculation unit 813, and defect pixel detection unit 814 can be regarded as a lower image processing device.

The operations of the upper image processing device and the image data processed by the upper image processing device can be referred to in the image data shown in FIG. 2A, and steps 601~607 in FIG. 6. The operations of the lower image processing device and the image data processed by the lower image processing device can be referred to in the image data shown in FIG. 2B, and steps 611~617 in FIG. 6.

It should be noted that if the upper image processing device does not detect that the target pixel is a possible defect pixel, a portion of the image data processed by the lower image processing device, such as the image data stored in the first line buffer 21 in FIG. 2B, is identical to the image data received by the upper image processing device, such as the image data 23 in FIG. 2A. if the upper image processing device has detected that the target pixel is a possible defect pixel, a portion of the image data processed by the lower image processing device, such as the image data stored in the first line buffer 21 in FIG. 2B, is the processed pixel data of the upper image processing device.

The upper image pixel average calculation unit 801 receives upper image data associated with a target pixel, and calculates a first pixel average value according to the target pixel and a plurality of reference pixels in the upper image data associated with the target pixel, as described in equation (1). The upper image pixel variance calculation unit 802 calculates a first pixel variance value according to the pixel values of the target pixel and the reference pixels, as described in equations (2-1) or (2-2). The delta-mean ratio calculation unit 803 calculates a first delta-mean ratio according to the calculated pixel average value and pixel variance value, as described in equation (3).

The diffusion coefficient mapping unit 805 calculates a diffusion coefficient according to the first delta-mean ratio and a diffusion coefficient mapping equation. The diffusion calculation unit 806 performs a diffusion calculation on the target pixel according to the calculated diffusion coefficient and the pixel values of the reference pixels to obtain the pixel value of the compensated target pixel.

The defect pixel detection unit 804 determines whether the target pixel is a possible defect pixel according to the first pixel variance value or the first delta-mean ratio, and transmits the determination result to the multiplexer 807. The multiplexer 807 determines whether to transmit the results of the diffusion calculation unit 806 or the target pixel to the diffusion calculation unit 813 and the defect pixel compensation unit 814 in the lower image processing device.

The lower image pixel average calculation unit 808 receives upper image data associated with a target pixel, and calculates a second pixel average value according to the target pixel and a plurality of reference pixels in the lower image data associated with the target pixel, as described in equation (1). The lower image pixel variance calculation unit 809 calculates a second pixel variance value according to the pixel values of the target pixel and the reference pixels, as described in equations (2-1) or (2-2). The delta-mean ratio calculation unit 810 calculates a second delta-mean ratio according to the calculated pixel average value and pixel variance value, as described in equation (3).

The diffusion coefficient mapping unit 812 calculates a diffusion coefficient according to the second delta-mean ratio and a diffusion coefficient mapping equation. In the embodiment, the diffusion coefficient mapping unit 805 and the diffusion coefficient mapping unit 812 has the same diffusion coefficient mapping equation. In another embodiment, the diffusion coefficient mapping unit 805 and the diffusion coefficient mapping unit 812 can be combined into a single diffusion coefficient mapping unit.

The diffusion calculation unit 813 performs a diffusion calculation on the target pixel according to the diffusion coefficient calculated by the diffusion coefficient mapping unit 812 and the pixel values of the reference pixels to obtain the pixel value of the compensated target pixel.

The defect pixel detection unit 811 determines whether the target pixel is a possible defect pixel according to the second pixel variance value or the second delta-mean ratio. The defect pixel detection unit 811 further determines whether its determination result is identical to that from the defect pixel detection unit 804. If the defect pixel detection unit 811 and the defect pixel detection unit 804 have the same determination result of the defect pixel, the defect pixel compensation unit 814 performs a defect pixel compensation process on the target pixel. In addition, the defect pixel detection unit 811 outputs a selection signal to the multiplexer 815, so that the multiplexer 815 may select the calculation result from the diffusion calculation unit 813 or the compensation result from the defect pixel compensation unit 814 as its output.

Figure 9A:
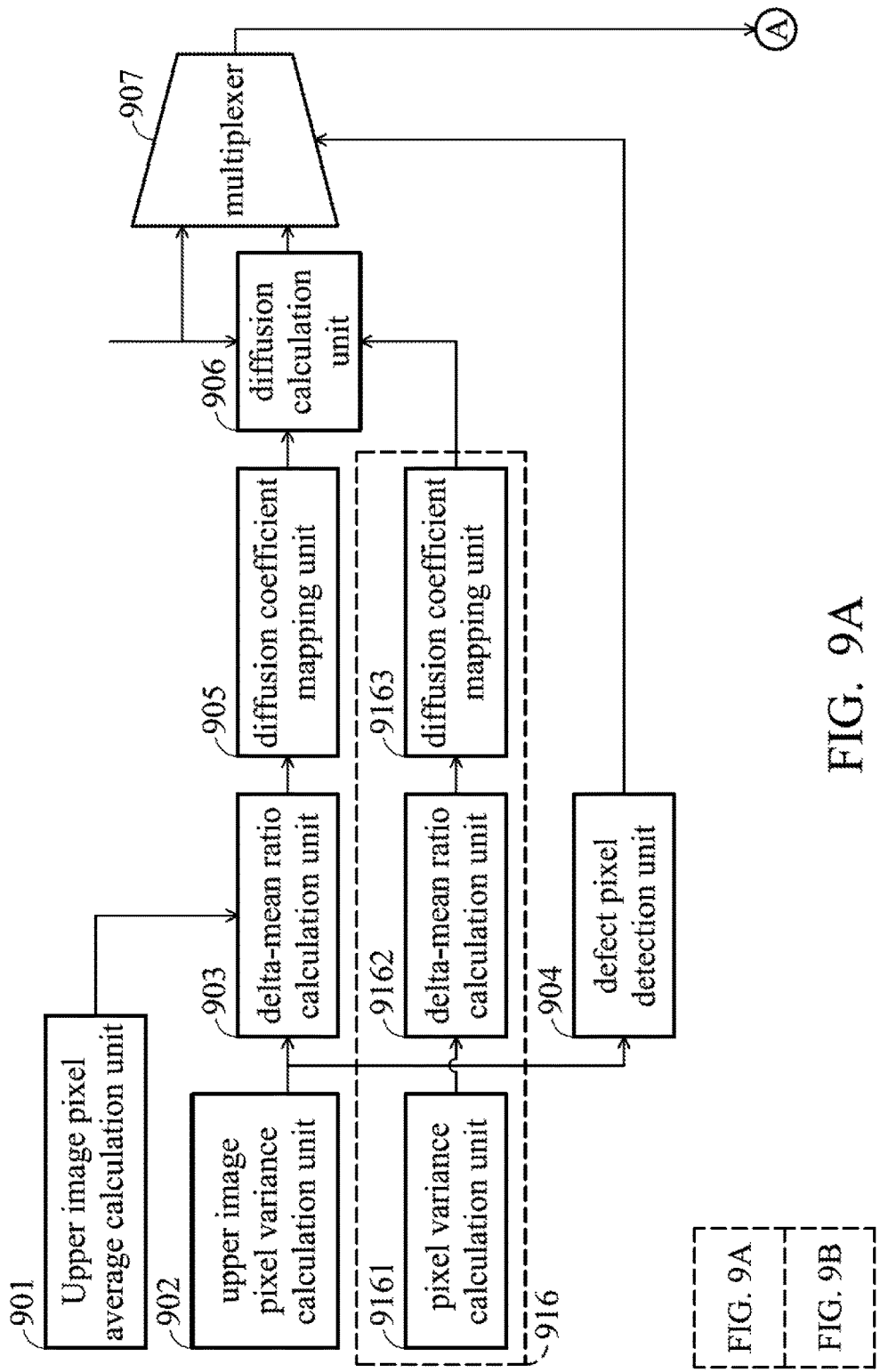
FIG. 9A and FIG. 9B are diagrams of an image processing device in accordance with another embodiment of the invention.
Figure 9B:
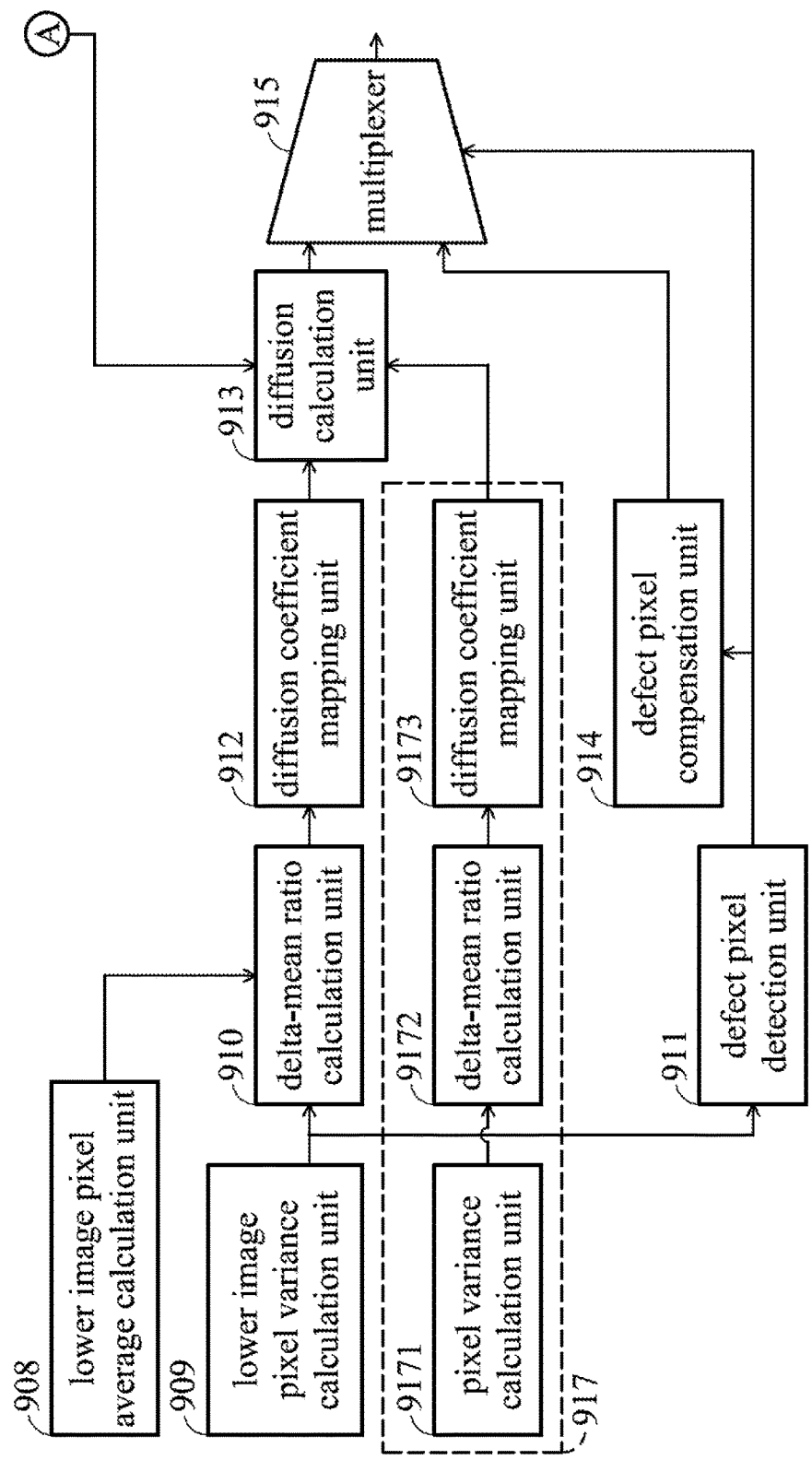

FIG. 9A and FIG. 9B are diagrams of an image processing device in accordance with another embodiment of the invention. The difference between the image processing device in FIGS. 9A and 9B and that in FIG. 8 is that the image processing device in FIGS. 9A and 9B further comprises an upper image crosstalk cancellation unit 916 and a lower image crosstalk cancellation unit 917. In another embodiment, the upper image crosstalk cancellation unit 916 and the lower image crosstalk cancellation unit 917 can be combined into a single image crosstalk cancellation unit.

The upper image crosstalk cancellation unit 916 and the lower image crosstalk cancellation unit 917 are configured to cancel the crosstalk of the green pixels Gb and Gr. Referring to FIG. 4 and FIGS. 9A and 9B, the pixel variance calculation unit 9161 calculates a third pixel variance between the target pixel G4 and reference pixels Gi and Gj. The delta-mean ratio calculation unit 9162 calculates a third delta-mean ratio according to the first pixel average value from the upper image pixel average calculation unit 901 and the third pixel variance value from the pixel variance calculation unit 9161. The diffusion coefficient mapping unit 9163 calculates a diffusion coefficient according to the third delta-mean ratio and a diffusion coefficient mapping equation, and provides the calculated diffusion coefficient to the diffusion calculation unit 906. The diffusion calculation unit 906 performs a diffusion calculation on the target pixel to obtain the pixel value of the compensated target pixel.

The pixel variance calculation unit 9171 calculates a fourth pixel variance value between the target pixel G4 and reference pixels Gm and Gn. The delta-mean ratio calculation unit 9172 calculates a fourth delta-mean ratio according to the second pixel average value from the lower image pixel average calculation unit 908 and the fourth pixel variance value from the pixel variance calculation unit 9171. The diffusion coefficient 9173 calculates a diffusion coefficient according to the fourth delta-mean ratio and a diffusion coefficient mapping equation, and provides the calculated diffusion coefficient to the diffusion calculation unit 913. The diffusion calculation unit 913 performs a diffusion calculation on the target pixel to obtain the pixel value of the compensated pixel value.

In the embodiment, the diffusion calculation unit 906 performs a diffusion calculation on the target pixel according to the diffusion coefficients from the diffusion coefficient mapping units 905 and 9163 and corresponding reference pixels to obtain the pixel of the target pixel. The diffusion calculation unit 913 performs a diffusion calculation on the target pixel according to the diffusion coefficients from the diffusion coefficient mapping units 912 and 9173 and corresponding reference pixels to obtain the pixel of the target pixel. The operations of other components in the embodiment can be referred to in the embodiment of FIG. 8, and thus the details will be omitted here.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine, such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image processing method, for use in an image-processing circuit having a first line buffer and a second line buffer, the method comprising:
receiving upper image data from an image sensor and storing first two rows of the upper image data in the first line buffer and the second line buffer;
calculating a first ratio using a target pixel in a current row of the upper image data and a plurality of first reference pixels in the upper image data;
calculating a first diffusion coefficient according to the first ratio and a diffusion coefficient mapping equation;
calculating a first pixel value of the target pixel according to the target pixel, the first reference pixels, and the first diffusion coefficient;
updating the first line buffer using the calculated first pixel value of the target pixel in the current row;
receiving lower image data from the image sensor and storing a next row of the lower image data in the second line buffer;

calculating a second ratio using the target pixel stored in the first line buffer and a plurality of second reference pixels in the lower image data, wherein the target pixel has the first pixel value;

calculating a second diffusion coefficient according to the second ratio and the diffusion coefficient mapping equation; and calculating a second pixel value of the target pixel according to the target pixel, the second reference pixels, and the second diffusion coefficient.

2. The image processing method as claimed in claim 1, wherein the first ratio is generated according to the steps of:

generating a first pixel average value according to the target pixel and the first reference pixels;

generating a first pixel variance value according to the target pixel and the first reference pixels; and generating the first ratio according to the first pixel average value and the first pixel variance value.

3. The image processing method as claimed in claim 1, wherein the second ratio is generated according to the steps of:

generating a second pixel average value according to the target pixel and the second reference pixels;

generating a second pixel variance value according to the target pixel and the second reference pixels; and generating the second ratio according to the second pixel average value and the second pixel variance value.

4. The image processing method as claimed in claim 1, further comprising:

determining whether the target pixel is a defect pixel according to the first ratio and/or the second ratio.

5. The image processing method as claimed in claim 4, further comprising:

when the target pixel is a defect pixel, performing a defect pixel compensation process on the target pixel.

6. The image processing method as claimed in claim 1, further comprising:

when the target pixel is a green pixel, performing an image crosstalk cancellation process on the target pixel.

* * * * *